UNITED STATES PATENT OFFICE.

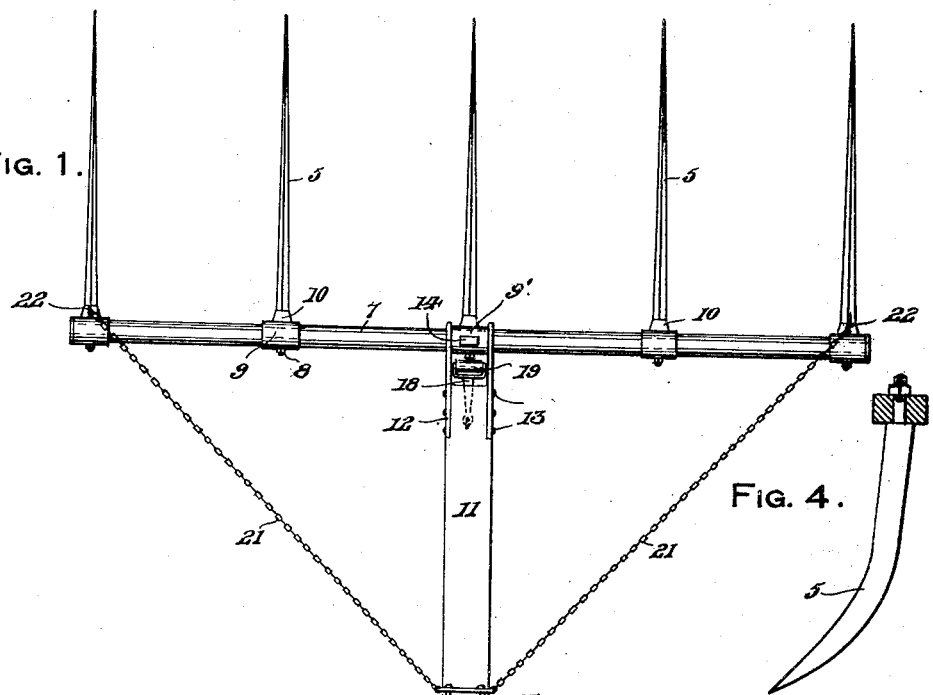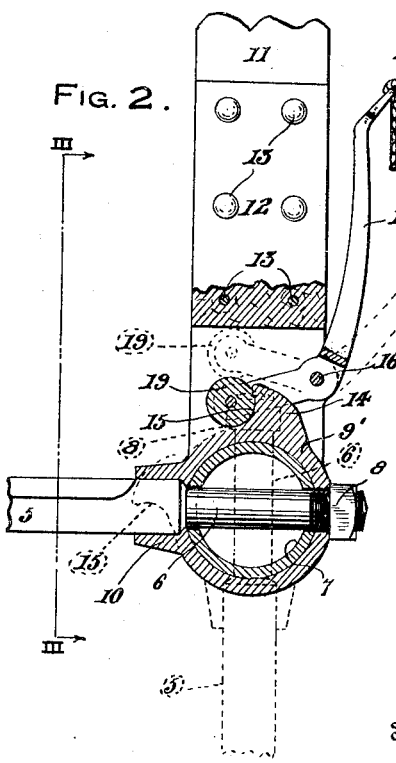

ROBERT W. McBRIDE, OF BURLEY, IDAHO.

HAY-FORK.

1,357,882.　　　　　Specification of Letters Patent.　　Patented Nov. 2, 1920.

Application filed January 13, 1920. Serial No. 351,166.

*To all whom it may concern:*

Be it known that I, ROBERT W. MCBRIDE, a citizen of the United States of America, residing at Burley, in the county of Cassia and State of Idaho, have invented certain new and useful Improvements in Hay-Forks, of which the following is a specification.

The primary object of the present invention has particular reference to a hay fork designed for association with a hoisting mechanism for transferring hay from a vehicle to a barn, or from one point to another.

A further object of the invention has particular reference to a hay fork embodying a novel form of mechanism for locking the tines of the fork into a stack of hay with means for releasing the locking mechanism when the hay has been transported to the desired point for deposit of the same.

With the above and other objects in view, the invention consists in the novel form, combination and arrangement of parts herein fully described and shown in the accompanying drawing, wherein like reference characters designate similar parts throughout the several views.

In the drawings,

Figure 1 is a top plan view of a hay fork constructed in accordance with the present invention, the bar and tines being alined in the position assumed when the device enters the hay, Fig. 2 is a fragmentary view partially in section of the latch mechanism for the fork, Fig. 3 is a cross sectional view taken on line III—III of Fig. 2, and Fig. 4 is a side elevational view of one of the tines illustrated as being curved.

The present invention aims to provide a hay fork particularly designed for transferring hay from a wagon to a stack and embodies a frame bar having a rod transversely journaled in one end thereof with the fork tines carried by said rod. When the fork is in position for insertion within the hay, the frame bar is substantially alined with the fork tines and when the tines are completely sunk into the hay, the frame bar is moved upon its pivotal connection with the fork rod to a substantially perpendicular position relative to said tines whereupon the latch mechanism carried by said bar and rod will become effective in retaining the parts in their changed position. Hoisting mechanism associated with the frame bar elevates the entire fork and the hay confined within the tines and transports the same to the desired position for storing, at which point, the lock mechanism may be manually released to permit the fork tines to discharge the hay confined therein.

Referring more in detail to the accompanying drawing, there is illustrated a hay fork embodying a plurality of tines 5 of curved formation as illustrated in Fig. 4 with threaded bolts 6 carried by the inner ends thereof for passage through the rod 7 as shown in Figs. 1 and 2 with retaining nuts 8 upon the projecting threaded ends of the bolts for maintaining the tines in position in the bar. Collars 9 having socketed projections 10 are received on the rod 7 and inclose the inner ends of the tines 5 to prevent rotary movement of the tines relative to the bar 7, the socketed extension 10 and the cross sectional shape of the tines being of the form best illustrated in Figs. 2 and 3.

A hoisting bar 11 has a pair of oppositely disposed strap bearings 12 connected thereto by bolts 13, extending beyond the end thereof for journaling upon the rod 7 as at 12' and inclosing the central tine collar 9', the bolt connection 6 of the central tine with the rod 7 maintaining the bar centrally positioned on said rod. The latch mechanism for maintaining the hoisting bar perpendicularly positioned relative to the tines 5 includes the formation of a cam lug 14 having a curved keeper face 15 formed upon the upper face of the central collar 9' and within the space between the side strap bearings 12. A pin 16 rotatably supports the forked end 17 of the lever 18 while a roller bearing 19 is journaled in the extreme free ends of said lever fork, the opposite end of the lever having a controlling pull cord 20 connected thereto.

To assist the locking lever for maintaining the hoisting bar and fork tines perpendicularly positioned, there is provided a pair of draft chains 21 connected as at 22 to the end tines 5 while the opposite ends of said draft chains 21 are connected to the sliding collar 23 which carries the draft link 24 with the collar 23 slidably extending through the adjacent end cap 25 of the hoisting bar 11.

Describing the operation of the device, it being assumed that the hoisting bar 11 and the tines 5 are substantially alined, the fork is forced into a pile of hay or like material for the complete embedding of the tines 5, the bar 11 is thereupon moved upon its strap bearing 12' with the rod 7 to a substantially perpendicular position, during which movement, the roller 19 will ride over the cam face of the lug 14 to be received in rear of said lug for contact with the keeper portion of the lug, thus to lock the bar in an angular position relative to said tines. Hoisting mechanism attached to the hook 24 will elevate the bar 11 while the tines will carry therewith a substantial quantity of material for transporting to another place. The draft chains 21 being connected to the sliding collar 23 will assist the latch mechanism in maintaining the tines 5 angularly disposed relatively to said bar. When the material such as hay or the like has been transported to the desired place and it is desired to discharge the same from the fork, the pull cord 20 upon the lever 18 is operated to shift said lever and to free the roller 19 from the working face 15 of said cam lug whereupon the weight of the material confined within the tines will cause a collapse of said tines and a slight upward movement of the bar 11 whereupon the confined material may be discharged as desired. It will therefore be seen that during the transportation of the material from one place to another, the same is securely maintained within the tines of the fork and the material is also easily dischargeable therefrom by releasing the restraining lever 18 from the cam lug 14.

While there is herein shown and described, the preferred embodiment of the invention, it is nevertheless to be understood that minor changes may be made in the novel form, combination and arrangement of parts herein described, without departing from the spirit and scope of the invention as claimed.

What is claimed as new is:

1. A hay fork of the type described comprising a hoisting bar, a rod journaled transversely of one end of the bar, tines fixed to said rod, a cam lug supported on said rod and a manually controlled lever supported on said hoisting bar adapted to maintain the hoisting bar perpendicularly positioned relative to said tines.

2. A hay fork of the type described comprising a hoisting bar, a rod journaled transversely of one end of the bar, tines fixed to said rod, a cam lug carried by said rod, a lever pivoted on said bar, a roller journaled in the inner end of said lever and adapted to ride over the cam projection and be restrained thereby for retaining the hoisting bar perpendicularly positioned relative to said rod.

3. A hay fork of the type described comprising a hoisting bar, a rod journaled transversely of one end of the bar, tines fixed to said rod, a cam lug carried by said rod, a lever pivoted on said bar, a roller journaled in the inner end of said lever and adapted to ride over the cam projection and be restrained thereby for retaining the hoisting bar perpendicularly positioned relative to said rod, and manually controlled means for releasing said lever and roller from the cam lug.

In testimony whereof I affix my signature.

ROBERT W. McBRIDE.